Patented Aug. 31, 1948

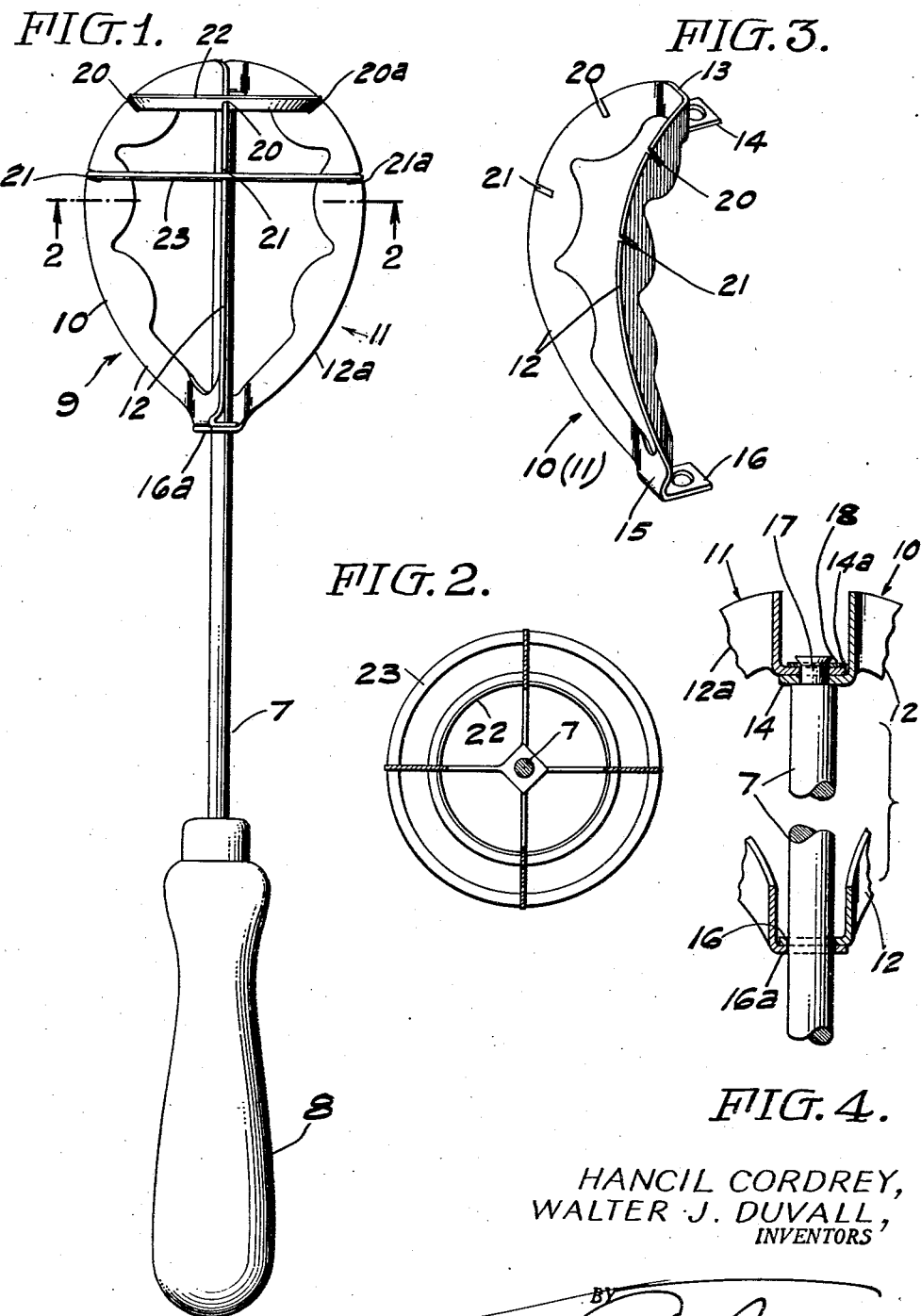

2,448,174

UNITED STATES PATENT OFFICE 2,448,174

BEATING AND MIXING DEVICE

Walter J. Duvall and Hancil Cordrey,
Chula Vista, Calif.

Application February 18, 1946, Serial No. 648,265

6 Claims. (Cl. 259—144)

This invention relates to a beating and mixing device utilizable to beat and mix a great variety of substances, but more particularly intended for use in beating or mixing liquid, semi-liquid and pasty edibles and substances, such as eggs and cake batters.

Among the objects of the invention are: to provide a beating and mixing appliance which the user can operate in a less tiresome manner; to provide a device which will insure a more complete and thorough beating and mixing of the entire quantity of the substance being operated upon when such a substance is contained in a suitable open-topped dish or like container; and to provide a manually operable beater or mixer of simplified construction and capable of being more easily assembled.

Other objects, advantages, and features of invention will hereinafter appear.

Referring to the accompanying drawing, which illustrates what is at present deemed to be a preferred embodiment of the invention, Fig. 1 is a side elevation of the complete device.

Fig. 2 is a cross section on line 2—2 of Fig. 1.

Fig. 3 is a perspective view showing separately one of the two approximately twin beater elements.

Fig. 4 is an enlarged sectional detail illustrating the mounting of the beater elements upon the shaft which rotatably supports them, portions of said shaft being broken away in order to contract the length of the view.

Referring in detail to the drawing, to the one end of the shaft 7 is secured a beater frame having the general designation 9. Said beater frame comprises two approximately twin beater members 10 and 11, the beater element 10 being separately shown in Fig. 3.

Describing in detail the beater member 10, said member consists of two twin blade portions 12 which are secured together at one end of the member 10 by a short run 13 of the sheet metal out of which this part of the structure is stamped by a suitable die. At the inner edge of said run 13 an apertured ear 14 is provided which serves to attach the outer end portion of the member 10 to the outer end of the shaft 7. At the opposite end of the member 10, the two twin portions thereof are united by means of a cross run 15, which is provided with an apertured ear 16 through which passes the shaft 7.

The only difference between the beater members 10 and 11 is that the member 10 is a little shorter than the member 11. The lettering of the structural details of these two members is therefore the same in the drawing except that the two wings of the beater member 11 are lettered 12a, its outer ear is lettered 14a and its inner ear is lettered 16a.

The outer end of the shaft 7 terminates in a diametrically reduced portion 17 of sufficient length to receive the superimposed ear 14 and 14a and also a washer 18 which overlies said ears and beyond which the diametrically reduced part 17 is peened over so as to hold said washer in place, care being taken to provide sufficient space to render the beating elements freely rotatable upon the shaft 7. At the inner end of the beating member the ears 16 and 16a are overlapped as best shown in Fig. 4, the shaft 7 passing loosely through them.

Describing more in detail the shape of the beater members, each of them is first stamped out of the sheet of metal so that its outer outline is ovoidal in shape, a considerable portion of metal being at the same time stamped out from the inside of this ovoidal outline, but not so much metal being removed from the inside part but that a considerable width of blade will be provided at each side of an intervening open space for liquid being beaten to surge through. By preference and as shown, a wavy outline is given to the inner edge of the two curved blades thus provided, this shape better adapting the device to agitate the semi-liquid or pasty materials operated upon. After the first stamping operation has been performed, each of the two beater members is subjected to a bending operation whereby each member is bent to the shape shown in the drawing. In addition to the feature already mentioned regarding the stamping operation, it is to be noted that each wing is so cut out as to provide each of its wings with outer notches 20, 20a and inner notches 21, and 21a.

The device is completed by providing the floating rings 22 and 23 shown in Figs. 1 and 2. The outer ring 22 may originally be stamped out from a piece of flat sheet metal, but if so is thereafter subjected to a second stamping or bending operation to give it a dished shape. With this outer ring cooperates the inner ring 23 which is of larger diameter but is only slightly dished. These rings 22 and 23 are respectively loosely fitted within notches provided for them in the beater, as shown in Fig. 1, each of the ring-receiving notches which have been described being considerably wider, preferably about twice as wide, as the rings which they contain. What may be termed a floating ring arrangement is thus provided. The rings when mounted in the slots should be of at least as great diameter as the part of the beating structure upon which they are mounted, but they may be of a slightly greater diameter, as shown in regard to the ring 22. After the device has been assembled said rings, though they both float freely in the notches provided for them, cannot be accidentally detached from the beater frame.

In mounting the rings 22 and 23 upon the rotary frame 9, owing to the larger end of the ovoidal frame being adjacent to the outer end of the shaft 7, the outer ears 14 and 14a are moved inwardly beyond their normal overlapped relation, thus contracting the outer end portion of the frame sufficiently to allow the rings to girdle the frame as a whole and seat within the notches 20 and 21 provided for them. Thereupon the frame is placed upon the handle as shown in Figs. 1 and 4 and said ears are fastened in place upon the handle and by preventing the frame from collapsing keep the rings in their operative positions.

In the operation of the device the material to be treated is preferably placed in a circular crock or similar container. Then the operator grasps the handle portion of the device and by imparting thereto a gyratory movement moves the rotary beating frame around the bottom portion of the crock until the desired mixing and beating has been effected. When the device is thus operated the rolling contact of the rings 22 and 23 against the crock insures the rotation of the blade-carrying frame which, in turn, efficiently agitates and whips the edible substance being mixed. It will be seen that the rings 22 and 23 are spaced considerably apart lengthwise of the frame 9 and serve as wheels to cause the blade-carrying frame to turn.

It is to be noted that the device is of a simple construction and that it is not difficult thoroughly to clean all parts thereof after its use.

What is claimed is:

1. A beater comprising a shaft having a handle portion at one end, and a beater frame rotatably mounted upon the opposite end portion of said shaft, said beater frame comprising a plurality of beater blades which are peripherally arranged with their widths extending radially in respect to their axis of rotation, each of said blades having a notch cut into its outer edge portion, and a ring seated in said notches and by them alone prevented from separation from the beating frame, said ring serving as a wheel to cause said frame to rotate as the latter is given a gyratory movement with the ring in contact with the interior bottom surface of a container, said blades being arranged in pairs, the members of each pair being circumferentially spaced apart and being united at their ends by short runs of sheet metal carrying apertured ears which rotationally surround the aforesaid shaft.

2. A beater comprising a shaft having a handle portion at one end, and a beater frame rotatably mounted upon the opposite end portion of said shaft, said beater frame comprising a plurality of beater blades which are peripherally arranged, said blades being in pairs, each pair consisting of two wings formable from sheet material by stamping and bending operations, the wings of each blade being integrally united at each end and having laterally directed ears extending from the parts that unite them, said ears rotatably connecting the wings of each blade with said shaft.

3. A beater comprising a shaft having a handle portion at one end, and a beater frame rotatably mounted upon the opposite end portion of said shaft, said beater frame comprising a plurality of beater blades which are peripherally arranged, and two rings carried by and girdling said blades, said rings being considerably spaced apart in relation to the length of the device and serving as wheels to cause said frame to rotate as it is given a gyratory movement with said rings in contact with the interior bottom surface of a container, said blades being arranged in pairs, the members of each pair being circumferentially spaced apart and united at each end by a short run of sheet metal having an inwardly directed edge portion forming an apertured ear rotationally surrounding the aforesaid shaft.

4. A beater comprising a shaft having a handle portion at one end, and a beater frame rotatably mounted upon the opposite end portion of said shaft, said beater frame comprising a plurality of beater members, each of said members consisting of two twin blade portions which are outcurved from said shaft longitudinally thereof in an edgewise manner and which are integrally secured together at each end of the beater frame by a short run of the sheet metal out of which they are made, and ears carried by said short runs, said ears being rotatably related to said shaft.

5. A beater comprising a shaft having a handle portion at one end, and a beater frame rotatably mounted upon the opposite end portion of said shaft, said beater frame comprising a plurality of beater members, each of said members consisting of an integral plate comprising two paired blade portions which are outcurved from said shaft longitudinally thereof in an edgewise manner and which are integrally secured together at each end of the beater frame by a short run of the sheet material out of which they are made, there being an open space for liquid being beaten to surge through intervening between said paired blade portions and between said short runs of sheet material, and bearing means carried by said short runs and operatively connected to said shaft.

6. In a beater frame, a shaft having a handle portion, a plurality of pairs of twin beater blades, and means securing said pairs of blades to each other circumferentially spaced apart around said shaft, the blades of each pair consisting of an integral, elongated piece of sheet metal having at each end an apertured projection rotationally to receive said shaft, the blades of each pair both being located at the same side of said shaft.

WALTER J. DUVALL.
HANCIL CORDREY.

REFERENCES CITED

The following references are of record in the file of this patent:

UNITED STATES PATENTS

| Number | Name | Date |
|---|---|---|
| 332,680 | Swain | Dec. 15, 1885 |
| 1,738,112 | Myers | Dec. 3, 1929 |
| 1,966,352 | Mahony | July 10, 1934 |
| 2,076,975 | Bach | Apr. 13, 1937 |